US006824727B2

(12) United States Patent  
Roy et al.

(10) Patent No.: US 6,824,727 B2  
(45) Date of Patent: Nov. 30, 2004

(54) METHOD FOR PREPARING SIALON CERAMIC MATERIAL

(75) Inventors: Robert Donald Roy, Edmonton (CA); David Allan, Sherwood Park (CA)

(73) Assignee: Indexable Cutting Tools of Canada Limited, Welland (CA)

( * ) Notice: Subject to any disclaimer, the term of this patent is extended or adjusted under 35 U.S.C. 154(b) by 47 days.

(21) Appl. No.: 09/968,689

(22) Filed: Oct. 1, 2001

(65) Prior Publication Data

US 2002/0107135 A1 Aug. 8, 2002

Related U.S. Application Data

(60) Provisional application No. 60/237,410, filed on Oct. 2, 2000.

(51) Int. Cl.$^7$ ............................................. C08B 33/32
(52) U.S. Cl. .................. 264/414; 264/430; 264/432; 264/628; 264/654; 264/683
(58) Field of Search ............................... 264/413, 414, 264/430, 432, 628, 654, 683, 603

(56) References Cited

U.S. PATENT DOCUMENTS

| | | | |
|---|---|---|---|
| 4,127,416 A | 11/1978 | Lumby et al. | 106/73.2 |
| 4,327,187 A | 4/1982 | Komatsu et al. | 501/97 |
| 4,401,617 A | 8/1983 | Ezis et al. | 264/332 |
| 4,434,238 A | 2/1984 | Ezis et al. | 501/98 |
| 4,547,470 A | 10/1985 | Tanase et al. | 501/87 |
| 4,560,669 A | 12/1985 | Matsuhiro et al. | 501/97 |
| 4,563,433 A | 1/1986 | Yeckley et al. | 501/97 |
| 4,652,276 A | 3/1987 | Burden | 51/308 |
| 4,711,644 A | 12/1987 | Yeckley et al. | 51/307 |
| 4,818,635 A | 4/1989 | Ekstrom et al. | 428/698 |
| 5,200,374 A | 4/1993 | Yamada et al. | 501/98 |
| 5,275,772 A * | 1/1994 | Yamamoto et al. | 264/654 |
| 5,413,972 A | 5/1995 | Hwang et al. | 501/98 |
| 5,525,134 A | 6/1996 | Mehrotra et al. | 51/307 |
| 5,874,377 A | 2/1999 | Apte et al. | 501/97.2 |
| 6,447,896 B1 * | 9/2002 | Augustine | 428/336 |

OTHER PUBLICATIONS

Anatoly Rosenflanz and I–Wei Chen, "Phase Relationships and Stability of ∝'–SiAlON", J. Am. Ceram. Soc. 82[4] 1025–36 (1999).

S. Bandyopadhyay, "The In Situ Formation of Sialon Composite Phases", J. European Ceramic Society 17 (1997) 929–934.

U. Kolitsch et al., "Phase equillibria and crystal chemistry in the $Y_2O_3$–$Al_2O_3$–$SiO_2$ system", J. Mater. Res., vol. 14, No. 2, p. 447–455 (Feb. 1999).

G.Z. Cao et al. "Influence of Addictive Composition on Microstructure of SIALONS", Euro Ceramics II, vol. 2, p. 883–887, Structural Ceramic Composites ed. (Sep. 1991).

T. Rabe, "Crystallization of Glassy Phase in Silicon Nitride Ceramics of SSN Type", Euro–Ceramics II, vol. 2, p. 877–881, Structural Ceramic Composites ed. (Sep. 1991).

D.H. Jack, "Ceramic Cutting Tool Materials", Materials & Design, vol. 7, No. 5 (Sep./Oct. 1986) p. 267–273.

C. Chatfield et al., "Microstructural Investigation of alpha–beta yttrium sialon materials", J. Materials Science 21 (1986) 2297–2307.

S. T. Buljan and V. K. Sarin, "Design and wear resistance of silicon nitride based composites", Science of Hard Materials Inst. Phys. Conf. Ser. No. 75, Chaptr. 9, p. 873–882 (1984).

K. H. Jack, "Sialons and related nitrogen ceramics", Journal of Materials Science 11 (1976) p. 1135–1158.

Frank L. Riley, "Silicon Nitride and Related Materials", J. Am. Ceram. Soc. 83[2] 245–265 (2000).

G. Z. Cao and R. Metselaar, "∝'–Sialon Ceramics: A Review", Chem. Mater. vol. 3, No. 2, 1991, p. 242–252.

Ekstrom et al., "Mixed ∝ and β–(Si–Al–O–N) Materials with Yttria and Neodymia Additions", Materials Science and Engineering A105/106 (1988) p. 161–168.

Dawn A. Bonnell et al., "Controlled Crystallization of the Amorphous Phase in Silicon Nitride Ceramics", J. Am. Ceram. Soc. 70, p. 460–465 (1987).

Wolfgang Dressler and Ralf Riedel, "Progress in Silicon–Based Non–Oxide Structural Ceramics", Int. J. Refractory Metals and Hard Materials 15 (1997) p. 13–47.

H. Kleebe et al., "Microstructure and Fracture Toughness of $Si_3N_4$ Ceramics: Combined Roles of Grain Morphology and Secondary Phase Chemistry", J. Am. Ceram. Soc. 82[7] p. 1587–67 (1999).

Zhuang Li, "Indentation Fracture Toughness of Sintered Silicon Carbide in the Palmqvist Crack Regime", J. Am. Ceram. Soc. 72 [6] 904–11 (1989).

B. S. B. Karunaratne and M. H. Lewis, "High–temperature fracture and diffusional deformation mechanisms in Si–Al–O–N Ceramics", J. Materials Science 15 (1980) 449–462.

B. S. B. Karunaratne and M. H. Lewis, "Grain–boundary de–segregation and intergranular cohesion in Si–Al–O–N ceramics", J. Materials Science 15 (1980) 1781–89.

T. Ekstrom & M. Nygen, "SiAlON Ceramics" 75[2] J. Amer. Ceram. Soc. 259 (1992).

* cited by examiner

Primary Examiner—Christopher A. Fiorilla
(74) Attorney, Agent, or Firm—Greenlee, Winner and Sullivan, P.C.

(57) ABSTRACT

A SiAlON-based ceramic particularly suited for use as a cutting tool in the high speed chip forming machining of metals composed of a SiAlON matrix including a) a phase of alpha' SiAlON represented by the general formula of $M_x(Si,Al)_{12}(O,N)_{16}$, wherein $0<x<2$ and M is at least two cationic elements, a first cationic element being 0.2 to 4 weight percent Mg and optionally between 0.5 and 15 weight percent of one or more of Ca, Sr, and Ba calculated as oxide, based on the SiAlON matrix, and a second cationic element being one or more of Y, Sc, La and the rare earth (RE) elements; b) a phase consisting of beta' SiAlON represented by the general formula $Si_{6-z}Al_zO_zN_{8-z}$ wherein $0<z<4.2$; and c) a component containing glass, and at least one additional intergranular crystal phase that is detectable using X-ray diffraction techniques is provided.

26 Claims, No Drawings

METHOD FOR PREPARING SIALON CERAMIC MATERIAL

CROSS-REFERENCE TO RELATED APPLICATIONS

This application takes priority to U.S. provisional application Ser. No. 60/237,410, filed Oct. 2, 2000, which is hereby incorporated by reference to the extent not inconsistent with the disclosure herewith.

FIELD OF THE INVENTION

The present invention generally relates to SiAlON-based ceramics useful as cutting tools for the machining of metallic materials.

BACKGROUND OF THE INVENTION

Cutting tools with high wear resistance and reliability are critical to improving industrial productivity. It has been found that ceramic cutting tools allow considerable increase in the rate of machining or improvements in the dimensional tolerances achieved through reduction in wear of the tool.

Such ceramic cutting tools are made from alumina, alumina-titanium carbide composites, silicon nitride or SiAlON. Of these, the alumina and alumina titanium carbide composites exhibit very good wear performance due to their high hardness but suffer from very poor reliability due to their tendency to chip. The SiAlON and silicon nitride grades are considered more reliable because they show less tendency to chip.

However, existing ceramic cutting tools are inadequate due to their poor combination of hardness and toughness and processability. There remains a need for a ceramic material with a combination of high wear resistance and reliability provided by a combination of high hardness and resistance to chipping.

a) Desired Properties of Ceramic Cutting Tools

It is taught, (see for example K. Jack, "Ceramic Cutting Tool Materials", Materials & Design Vol. 7, September/October 1986, pg. 267–270, see especially pg. 270. and C. Chatfield, T. Ekstrom & M. Mikus, J. Mat. Sci. 21, pg. 2297–2307 (1986)) that the properties of interest in metal cutting inserts are resistance to mechanical and thermal shock, resistance to plastic deformation at high temperatures, on the order of 1000° C., resistance to abrasive wear, and resistance to chemical or dissolution wear. Resistance to mechanical shock is improved by high toughness, while resistance to abrasive wear is improved by both high toughness and high hardness. Lack of toughness leads to inserts being unreliable because they are susceptible to chipping, while too low a hot hardness can result in failure due to excessive plastic deformation. Low hardness results in poor resistance to abrasive wear as discussed below. Resistance of oxide based cutting tools such as alumina or alumina titanium carbide composites to chemical wear while machining steel is much better than that of silicon nitride or SiAlON.

The wear of a ceramic is taught by S. T. Buljan & V. K. Sarin ("Design and Wear Resistance of Silicon Nitride-Based Composites", Inst. Phys. Conf. Ser. 75, Chap. 9, pg. 873 (1986)) to be related to the hardness and toughness of the material according to a factor $K_{ic}^{3/4} H^{1/2}$ where H is hardness and $K_{ic}$ is fracture toughness, with improved wear resulting fro higher hardness and higher toughness.

Ceramic materials made from SiAlONs typically have mechanical and physical properties similar to those of beta silicon nitride, including a low thermal expansion, but chemical properties similar to aluminum oxide (see for example, K. Jack, "Sialons and Related Nitrogen Ceramics", J. Mat. Sci. 11 (1976) 1135–1158, pg. 1146).

b) SiAlON: Silicon Nitride with Alumina

"SiAlON"s are phases in the silicon-aluminum-oxygen-nitrogen and related systems. SiAlON ceramic materials differ from silicon nitride because aluminum and oxygen are contained in the crystal structure (see K. Jack, "Sialons and Related Nitrogen Ceramics" J. Mat. Sci. 11 (1976) 1135–1158, and F. Riley, "Silicon Nitride and Related Materials", J. Amer. Ceram. Soc. 83 [2] 245–65, February 2000).

Ceramic items made from SiAlON typically have high elevated temperature strength and hardness and are desirable for industrial applications. In particular SiAlON retains hardness at high temperatures better than alumina (see for example Jack, Materials & Design, Vol 7, No 5, October 86, pg. 271, FIG. 10).

In addition to the aluminum and oxygen incorporated into the structure, compounds such as yttria are commonly added to assist sintering. During sintering these compounds react with silica on the surface of the silicon nitride, silica deliberately added or otherwise present as an impurity. Similarly such compounds react with any alumina present, either deliberately added or present on the surface of aluminum nitride, or otherwise added as an impurity.

These additional elements greatly increase the complexity of the phase relations affecting SiAlON materials and thus increase the difficulty in processing SiAlON materials to achieve the desired properties. It is known, for example, that the phase chemistry of the intergranular phases in SiAlON is more complex than that of the corresponding silicon nitride ceramic systems (see for example F. Riley J. Amer. Ceram. Soc. 83 [2] pg. 259, February 2000). On the other hand, the complexity of the phase relations for these materials enables articles made from SiAlONs to be fabricated with much more economical processes. For example, in the case of silicon nitride, dense bodies can generally only be made by hot pressing or the use of high gas pressure sintering techniques to prevent the decomposition of the silicon nitride phase during densification. The SiAlON material typically may be processed to a high density without the application of high pressures. This process is typically known as pressureless sintering and consists of cold pressing followed by sintering at normal atmospheric pressures of an inert gas. The use of this process enables considerable reduction in the cost of fabricated articles.

The complex phase relations of the SiAlON materials makes it very difficult to accurately or definitively define the nature of the crystal structure in a finished ceramic. Thus it is useful and common to define such ceramic compositions in terms of the raw materials from which they are fabricated (i.e., formulations) in addition to attempting to fully characterize the finished materials.

c) Alpha' & Beta' Phases of SiAlON

The two best known crystal phases in the SiAlON family are the alpha' and beta' phases, based on corresponding alpha and beta silicon nitride crystal structures. In these SiAlON phases a portion of the silicon and nitrogen atoms are replaced by aluminum and oxygen atoms.

The beta' SiAlON phase is generally considered to be represented by the formula $Si_{6-z}Al_zO_zN_{8-z}$, wherein 0<z<4.2. This structure does not incorporate additional metal ions in the crystal lattice.

Microstructurally, beta' SiAlON mostly appears as elongated high aspect ratio fiber like grains which contribute to high strength and toughness in the ceramic material.

Ceramic articles made from beta' SiAlON can show high values of toughness but show low hardness, that is their hardness is, for example, on the order of 92 Rockwell (A scale) (see U.S. Pat. No. 4,547,470 to Tanase et al.). As a result of the low hardness such ceramic cutting tools do not show satisfactory wear resistance.

The alpha' SiAlON phase is generally considered to be represented by the formula $M_x(Si,Al)_{12}(O,N)_{16}$ wherein 0<x<2 and M is an element such as Mg, Y, Ce, Sc or other rare earth elements. More precisely, the crystal stoichiometry is represented by $M_{m/v}S_{12-m-n}Al_{m+n}OnN_{16-n}$ (see G. Z. Cao and R. Metselaar, "Alpha'-Sialon Ceramics: A Review", Chem. Mat. Vol 3 No 2, 242–252 (1991)), wherein v is the valence of M. The two formulas are used interchangeably in this specification. This structure accommodates additional M ions that are not accommodated within the beta' SiAlON structure.

Typically alpha' SiAlON appears mostly as equiaxed grains in the microstructure of the ceramic and is associated with higher hardness in the material. This equiaxed microstructure does not provide the high toughness associated with the fiber-like beta' SiAlON microstructure.

Thus, in attempts to provide ceramic SiAlON compositions which are usable in high temperature applications such as cutting tools, various authors and patentees have taught the combination of alpha' SiAlON with beta' SiAlON. Thus, it is taught by U.S. Pat. No. 5,413,972 to Hwang et al., (at col. 1, l. 39 to 43) and F. Riley, ("Silicon Nitride and Related Materials", J. Amer. Ceram. Soc. 83 [2] 245–65, February 2000), that by varying the starting materials, it is possible to vary the alpha' and beta' phases and hence the hardness and strength can be tailored.

It is taught by Ekstrom et al. ("Mixed alpha' and beta' (Si—Al—O—N) Materials with Yttria and Neodynia Additions", Mat. Sci. and Eng. A105/106 (1988) 161–168), that mixed alpha' and beta' SiAlON materials exhibit benefits compared with pure beta' SiAlON ceramics in engineering applications such as cutting tools. This is attributed to the higher hardness associated with the presence of the alpha' SiAlON phase (see Chatfield, Ekstrom & Mikus, J. Mat. Sci. 21, pg. 2297–2307 (1986)). In order for ceramic materials such as these to achieve useful properties, the ceramic must be made to near theoretical density which in turn requires sintering aids. It is also taught that the most successful sintering aids used are yttria or yttria plus alumina. The compositions which allow pressureless sintering of fully dense ceramic materials consisting of alpha' and beta' SiAlON phases with yttria sintering aids are well established. For example, U.S. Pat. No. 4,327,187 to Komatsu et al. teaches the use of yttria, alumina and AlN in silicon nitride ceramic formulations, and producing a sintered ceramic body having greater than about 95% of theoretical density by adding quantities of $TiO_2$, MgO or $ZrO_2$. This patent states that a density of >95% can be obtained with good retention of hot strength by an undefined pressureless sintering method; however, a method to achieve a useful product simultaneously having high density, high toughness and high hardness is not disclosed.

U.S. Pat. No. 4,711,644 and U.S. Pat. No. 4,563,433, both to Yeckley et al., teach that yttrium is the most desired additive to make a dual phase alpha' and beta' SiAlON material and cutting tool because it "produces high melting glasses with the silica and alumina present and allow the material to be used at higher temperature than would be possible with low melting glass" (see U.S. Pat. No. 4,563,433, col. 4, 1. 9).

d) Toughness

It is known that the high temperature properties and the room temperature fracture toughness of silicon nitride and related ceramics depends on not only the ratio of the alpha to beta phase and the size and shape of the beta phase grains but it also depends on the amount and nature of the minor phases disposed between the grains of the alpha and beta phases (see Kleebe et al., J. Amer. Ceram. Soc. 82 [7] 1857 (1999)).

e) Degradation of Properties

Many papers and patents note that a common problem is that the intergranular phases degrade the properties of ceramics. For example, U.S. Pat. No. 5,413,972 to Hwang et al; D. Dressler & R Riedel, Int. J. Refractory Metals & Hard Materials 15 (1997), pg. 13–47 especially pg. 23; and D. A. Bonnel et al., J. Amer. Ceram. Soc. 70 (1987), pg. 460, all teach that these intergranular phases are undesirable because they generally cause high temperature degradation and reduction in strength.

Riley (J. Amer. Ceram. Soc., February 2000, pg. 259) notes that a distinguishing feature of the mixed alpha' and beta' SiAlON system is that the conversion of the alpha' SiAlON to beta' SiAlON releases glass because the alpha' phase can accommodate other metal oxides while the beta' phase cannot. As a result, the high temperature properties are expected to deteriorate. For example, U.S. Pat. No. 4,818,635 to Ekstrom et al., teaches SiAlON materials for cutting tools that can be sintered without pressure by adding alumina and small additions of metal oxides, nitrides, oxynitrides of Y, Ca, Mg, Be, lanthanides etc., or mixtures thereof. This reference also teaches that the amount of glass must be small, but not so small as to affect the toughness behavior. Certain metals are taught to lower the softening of the glass phase, for example Ca, Mg, Fe etc. In order to obtain a glass phase having optimum high temperature properties, the content of such elements must be small. As stated therein: "Additions of Mg compounds will, for instance give a ceramic material which is more easily processed . . . . However the material will lack good high-temperature properties." (see col. 2, 1. 51–55).

f) Prior Art Attempts to Avoid Degradation of Properties

Prior attempts to overcome the above limitations are as follows:

Eliminating or minimizing these intergranular materials—For example, patents such as U.S. Pat. No.

5,413,972 to Hwang et al., teaches eliminating or minimizing intergranular phases by controlling the starting materials. However these methods produce ceramic bodies that are difficult if not impossible to fully densify. It is also taught that eliminating the additives changes the microstructure and impairs the mechanical properties (see col. 2, 1. 1–5).

U.S. Pat. No. 4,563,433 to Yeckley et al., teaches complicated methods of sintering and materials containing certain defined "glassy phase," with a minimum hardness of 92.5. However the process is very difficult to apply in manufacturing, and the hardness is insufficient for practical application for cutting tools.

Crystallizing these intergranular materials—However it is taught, (see for example Chatfield et al. supra pg. 2302) that reduction in properties is associated with crystallization. The article states: "Post heat treatment above 1400 K causes the glass to partially re-crystallize into YAG. The toughness of the material decreases and the cutting tool performance in turning cast iron drops drastically."

Adding larger amounts of AlN (see T. Ekstrom & M. Nygen, "SiAlON Ceramics" 75 [2] J. Amer. Ceram. Soc. 259 (1992))—These methods suffer from the problem that complete crystallization may be inhibited by kinetic factors and do not reduce the glass content sufficiently to be effective. Such methods are further complicated in SiAlON materials because of their complex phase relations which in turn can produce numerous undesirable phases with even slight changes in starting compositions (see U.S. Pat. No. 5,413,972 to Hwang et al., col. 2, 1. 44–48).

Providing a dispersed phase to restrict or modify the grain size—Thus, for example, U.S. Pat. No. 4,547,470 to Tanase et al., discloses ceramic SiAlON-based materials having a dispersed phase selected from the carbides of Ti, Zr or Hf, nitrides thereof, carbo-nitrides thereof, or carbo-oxy-nitrides thereof, where the dispersed phase is intended to restrain the growth of the SiAlON phases. This approach restricts the growth of the fiber-like beta' grains and thus will reduce the toughness of the ceramic.

Providing a very refractory intergranular phase by the use of specific rare earth (RE) oxides and/or the formation of specific secondary phases—For example in U.S. Pat. No. 5,200,374, to Kohtoku et al., discloses a SiAlON based sintered body having a high mechanical strength and fracture toughness comprising a first phase of RE-alpha' SiAlON, a second phase of beta' SiAlON and a third crystal phase containing at least one rare earth element (RE), wherein RE is Ho, Er, Tm, Yb or Lu. The third phase is $RE_2M_{2-U}O_{7-2U}$, where M is at least one of Hf, Zr and U. This approach also has the limitations that it is difficult to achieve due to the complexity of the phase system and difficult if not impossible to process into a useful article.

The above approaches typically produce ceramic bodies that have inferior properties or are difficult if not impossible to fully densify and fabricate into useful products.

In summary, with respect to the use of MgO, U.S. Pat. No. 4,327,187 to Komatsu et al., lists MgO as an aid for the densification of silicon nitride-based ceramics. Alpha' plus beta' SiAlON composite ceramics are taught in U.S. Pat. No. 4,711,644 and U.S. Pat. No. 4,563,433 to Yeckley et al., but MgO is contraindicated as causing degraded high temperature properties. MgO is also contraindicated by U.S. Pat. No. 4,818,635 to Ekstrom et al. Multi-cationic mixtures in the alpha' SiAlON crystal structure are known from U.S. Pat. No. 5,413,972 to Hwang et al., but the presence of a third non-alpha' SiAlON, non-beta' SiAlON intergranular phase is taught away from as resulting in degraded properties. As well, Huang et al. teach the requirement of pressure sintering in order to achieve a dense ceramic.

SUMMARY OF THE INVENTION

A new ceramic material has been discovered by the inventors having a surprisingly excellent combination of high hardness, significantly enhanced toughness and utility for the high speed machining of metals. The new material is a SiAlON ceramic material having a SiAlON matrix comprising:

a) a phase of alpha' SiAlON represented by the general formula of $M_x(Si,Al)_{12}(O,N)_{16}$, wherein $0<x<2$ and M is at least two cationic elements, a first cationic element being Mg and optionally one or more of Ca, Sr, and Ba, and a second cationic element being one or more of Y, Sc, La and the rare earth (RE) elements;

b) a phase of beta' SiAlON represented by the general formula $Si_{6-z}Al_zO_zN_{8-z}$ wherein $0<z<4.2$; and c) a component containing glass, and at least one additional intergranular crystal phase that is detectable using X-ray diffraction (XRD) techniques, wherein the amount of the first cationic element is 0.2 to 4 weight percent (more preferably 0.3 to 3 weight percent, most preferably 0.4 to 2.5, calculated as an element and based on the SiAlON matrix, and the amount of the second cationic element is 0.5 to 15 weight percent, calculated as an oxide (more preferably 3 to 10 weight percent, most preferably 4 to 8 weight percent), based on the SiAlON matrix.

The above amounts for M as used herein and in the claims are meant to refer to amount as included in the "as formulated" composition, based on the SiAlON matrix phase, that is based on the combined alpha' and beta' SiAlON phases and the component c).

The term "rare earth (RE)" as used herein and in the claims means the rare earth elements having atomic numbers between 57 and 71, but excluding Ce.

Preferably the first cationic element is Mg alone. Preferably the second cationic element is one or more of Sc, Y, La, Yb, Sm, Nd, and Pr, more preferably Y or Yb, and most preferably Y. It is discovered that the Mg is distributed between the alpha' SiAlON phase and the component c). This, as well as the detection of the intergranular crystal phase, can be confirmed by transmission electron microscopy (TEM).

A significant and surprising advantage of the present invention is the unexpected results of using Mg to form one or more intergranular crystal phases that may be detected by XRD. Such elements were previously considered by the prior art to be harmful to the properties of the SiAlON body by the formation of low melting glasses, as described above.

It should be understood that no assertion is being made that any metal, oxide or nitride exists as separate phases within the ceramic unless explicitly described as a separate or dispersed phase. Thus, a reference to an amount of a component expressed as a metal, oxide or a nitride is made for the purposes of calculation only, without implying that the component is present in that form in either a precursor or final formulation.

Depending on the application for the SiAlON ceramic material of the invention, the ceramic material of this invention may also contain a substantially inert filler such as a known oxide, nitride, silicide, carbide, carbo-oxy-nitride, oxy-carbide, carbo-nitride, or boride of one or more of the elements Ti, Zr, Hf, Nb, Ta, V, Cr, Mo, W, B, Si. By "known" is meant only those compounds which are known to exist, thus excluding impossible or improbable combinations such as borides of boron. Preferably the inert filler is one or more of TiN, Ti(C,N) (with the atomic ratio of C:N between 0 and 1) $Mo_2C$, TiC and SiC, with TiN, $Mo_2C$ and Ti(C,N) being most preferred. The inert filler is included in amounts from 1 to 50 volume percent, based on the final ceramic material. Preferably such additional particles may constitute between 1.5 and 40 volume percent. Most preferably the range is between 2 and 25 volume percent. The inclusion of the inert filler may result in somewhat softer SiAlON ceramic materials for use as a composite which contains the SiAlON matrix phases with the filler in a dispersed phase.

It has been found that the new SiAlON ceramic material can provide wear performance better than that of previously known SiAlON and/or silicon nitride cutting tools. A significant and unexpected advantage of this new material is that it combines high wear resistance and fracture resistance with low cost since it may be easily fabricated by the inexpensive cold pressing and sintering method.

Ceramic materials of the present invention having the best wear and fracture resistance properties are formed by microwave sintering, which avoids the necessity of pressure sintering.

The invention also extends to a method of preparing a SiAlON ceramic material comprising:

a) providing a powder mixture of:
  i. silicon nitride as the major ingredient;
  ii. 0.1 to 20 parts by weight of an oxide or nitride of Sc, Y, La or a RE;
  iii. 0.1 to 20 parts by weight of aluminum nitride;
  iv. 0.1 to 6.5 parts by weight of an oxide or nitride of Mg and optionally of one or more of Ca, Sr, and Ba;
b) forming a green compact from the powder mixture; and
c) heating the green compact to form a ceramic material with closed porosity.

The heating step preferably comprises:

c1) an optional first heating step at about 300 to 900° C., preferably about 600° C., in a static or flowing non-reactive atmosphere;
c2) a second heating step at between 1500 and 1800° C. in a static or flowing non-reactive atmosphere; and
c3) an optional third heating step in a hot isostatic press at a temperature between 1400 and 2000° C. under a pressure of a non-reactive gas at a pressure of between 690 KPa and 413 MPa.

Heating is preferably accomplished by microwave sintering in a flowing non-reactive gas at a temperature of 1650–1800° C., in order to provide the best properties and to avoid the need for pressure sintering.

It is also a surprising discovery of this invention that the use of alumina, or compounds containing alumina such as magnesium aluminate spinel, in the formulation does not produce the desired combination of properties. Thus, the formulation is most preferably substantially free of alumina or compounds thereof. While aluminum nitride is a preferred material for formulations of the present invention, other ingredients can be considered substantially free of alumina if the equivalent aluminum oxide content is less than about 1.5, more preferably less than 1, weight percent of the finished ceramic material.

The invention also extends to cutting tools and cutting tool inserts prepared from the ceramic materials.

In accordance with this invention a ceramic metal cutting insert is provided for chip forming machining of metallic materials. The material has a hardness of greater than 92 Ra, and for some applications greater than 93.5 Ra, or greater than 94 Ra. The ceramic material also has an indentation fracture toughness of greater than 6.5 $MPam^{1/2}$, preferably greater than 7.0 $MPam^{1/2}$ and most preferably greater than 7.5 $MPam^{1/2}$. The ceramic material preferably has a density greater than 98% theoretical, and more preferably greater than 99% theoretical.

DETAILED DESCRIPTION OF THE INVENTION

This invention can provide a dense multi phase SiAlON ceramic material that preferably has no more than 5 volume percent porosity, preferably less than 1 volume percent porosity, and comprising a mixture of at least an alpha' SiAlON phase, a beta' SiAlON phase, and usually with a third component which includes both glass and an additional intergranular crystal phase, the latter phase being detectable by XRD. The ceramic has an excellent combination of room temperature toughness and hardness and exhibits excellent wear resistance in cutting tool applications.

The alpha' SiAlON phase of this invention is represented by the general formula $M_x(Si,Al)_{12}(O,N)_{16}$ wherein $0<x<2$ and M is at least two cationic elements, with the first being Mg and one or more of Ca, Sr, and Ba, and the second being one or more of Sc, Y, La and the rare earth elements (RE). Preferably x is between 0.25 and 2.

In a preferred embodiment, M is a multi-cationic mixture of Mg and Y.

The beta' SiAlON phase is represented herein by the general formula $Si_{6-z}Al_zO_zN_8-z$ wherein $0<z<4.2$. However, within the above described range, if the value of z is too large the hardness is reduced. Therefore the value of z is preferably greater than 0 but less than 2, more preferably less than 1, and most preferably less than 0.5.

Alumina, or compounds containing alumina such as magnesium aluminate spinel, in the formulation does not produce the desired combination of properties. Thus, the formulation is most preferably substantially free of alumina or compounds thereof. While aluminum nitride is a preferred precursor material for formulations of the present invention, other precursors can be considered substantially free of alumina if the equivalent aluminum oxide content is less than about 1.5, more preferably 1, weight percent of the finished ceramic material.

The ceramic materials of this invention may optionally include additional substantially inert fillers as dispersed phases of hard or refractory materials such as the known nitrides, oxides, silicides, carbides, carbo-nitrides, carbo-oxy-nitrides, oxy-carbides, borides and like compounds of one or more of the elements Ti, Zr, Hf, Nb, Ta, V, Cr, Mo, W, B, and Si in amounts from 1 to 80 volume percent. Preferably such additional particles may constitute between 1.5 and 40 volume percent. Most preferably the range is between 2 and 25 volume percent. The size and shape of the inert filler particles may have an effect on the ultimate performance of cutting tools formed therefrom. It is found that particle size can be varied over a wide range while still enabling good ceramic properties. For instance, samples have been made with TiN as the filler having the following D50 volume percent characteristics: Grade A, D50 Volume Percent 7.9 μm and Grade C, D50 Volume Percent 0.2 μm. The larger particles or mixtures containing the larger particles may produce the most desirable properties.

The properties of the SiAlON material are readily measured by the use of standard tests. In particular, for the purposes of this invention the ceramic is evaluated for density by the Archimedes' method, for hardness by Rockwell A hardness testing, for fracture toughness by the indentation technique, and for wear resistance by measuring the wear of an insert used in a machining operation.

The Rockwell hardness test measures the resistance of the ceramic material to indentation by a cone shaped diamond indentor as described by ASTM standard E18. The room temperature hardness of the SiAlON material of this invention is preferably at least about 93.5. By adjusting the heat treatment conditions and compositions to increase the alpha' SiAlON content, higher hardness values of above 94 are obtained. Preferably, the Rockwell hardness ranges from 94.2 to above 95 on the A scale.

The room temperature fracture toughness, which measures the resistance of a material to fracture or chipping, is greater than 6.5 MPam$^{1/2}$. The fracture toughness ($K_{1c}$) is preferably measured by the indentation technique, using a Vickers diamond indentor with a 30 kg applied load, and is then calculated using the equation:

$$K_{1c} = 0.0950 \, P/c^{2/3}$$

wherein P is the load applied to the indentor in Newtons, and c is half the total crack length (see Li et al. Indentation Fracture Toughness of Sintered Silicon Carbide in the Palmquist Crack Regime, J. Am. Ceram. Soc. 72 [6] 904–11 (1989), equation M4). Preferably, the indentation fracture toughness is greater than 6.5 MPam$^{1/2}$. Most preferably, the toughness is greater than 7.0 MPam$^{1/2}$.

The alpha' SiAlON, phase, beta' SiAlON phase, and the third component containing glass, and at least one intergranular crystal phase, may be present in any amount so long as they are all present in the ceramic material. The existence of these crystalline phases may be measured by such methods as XRD analysis. The content of a glass phase, if any, may be determined by techniques such as analysis of Scanning Electron Microscope and Transmission Electron Microscope photomicrographs. Quantification of small amounts of glass, for example less than 2 weight percent, is difficult since the glass may be present in the form of small pockets at grain boundary triple points as well as a thin grain boundary phase having a thickness of only a few nanometers.

The physical properties of the ceramic material of this invention can be altered by varying the ratio of the alpha' and beta' SiAlON phases. In practice varying the ratio of alpha' to beta' phase is accomplished by a combination of varying the ratios of the starting raw materials such as yttrium oxide, aluminum oxide, aluminum nitride etc. from which the precursor powder is made and/or adjusting the conditions of temperature and time under which the material is densified during processing. For example, by increasing the percentage of the alpha' SiAlON phase the hardness of the material increases. Generally the weight ratio of the alpha' to beta' SiAlON phases measured by a peak area ratio of the XRD patterns, is anywhere from 1:99 to 99:1. Preferably, the weight ratio is between about 20:80 and 80:20. More preferably, the weight ratio is between 35:65 and 65:35, or close to 50:50.

The SiAlON material of this invention is preferably substantially fully dense, having no significant porosity (i.e., a closed porosity) and a density of greater than 97%, more preferably greater than 98% of the theoretical, and most preferably greater than 99% of the theoretical value.

The SiAlON materials of this invention are prepared by sintering a powder mixture of raw materials or ingredients. The raw materials include silicon nitride, aluminum nitride, optionally silica, and at least one oxide or nitride of the element Mg and optionally of one or more of Ca, Sr, Ba, and at least one oxide or nitride of an element selected from the group consisting of Sc, Y, La and a RE. Preferably, the raw materials, other than aluminum nitride precursor material, do not contain aluminum oxide or compounds of aluminum oxide, except as naturally occurring impurities of less than about 1.5, more preferably less than 1, weight percent. Similarly, aluminum oxide or compounds thereof should not be introduced as an impurity as a result of contamination during processing in amounts of more than about 1 weight percent. One skilled in the art will recognize that the oxide or nitrides may be derived from other precursors such as hydroxides, carbonates, sulfates, nitrates and such compounds which may be substituted. As used herein and in the claims, the phrase "oxides or nitrides of" is meant to include such alternate precursors in appropriate amounts to generate the oxides or nitrides.

It is also expected that the form in which the Mg, Ca, Sr, or Ba-containing compound or compounds is added may have an effect on the properties of the ceramic article. In the simplest case, the particle size of the compound is expected to affect its effective distribution within the ceramic body. It is also possible that the chemical form of the additive may affect the processing behavior. This may arise due to the effect of heating rates and chemical form on the decomposition of the compound into an oxide or similar intermediate compound. The different intermediate decomposition process may affect the size, shape, and surface area of the intermediate oxide product, which in turn changes its effectiveness in forming a low temperature transient liquid phase or the kinetics of formation of secondary crystal phases and/or alpha' SiAlON. It has been found that Mg in the form of magnesium carbonate or magnesium carbonate hydroxide works well.

The silicon nitride material used in preparing the ceramic material of this invention is preferably present in an amount which is in the range of from about 70 to about 90 weight percent based on the total weight of the mixture. The silicon nitride can be any form of powder, including the crystalline forms of alpha and beta silicon nitride or non-crystalline, amorphous silicon nitride or mixtures thereof. Preferably, the silicon nitride has a high purity, a high alpha/beta weight ratio, and a mean particle size of within the range of about 0.2 to 5 μm, more preferably from about 0.2 μm to about 2 mm, as measured by laser diffraction methods.

Oxygen is inherently introduced into the mixture as oxide or oxy-nitride coatings on the surfaces of the starting powders such as silicon nitride and aluminum nitride. For calculation purposes, one skilled in the art will be able to convert the oxygen content of such powders into an equivalent content of $SiO_2$ and $Al_2O_3$. Typically, the amount of oxygen introduced naturally through the silicon nitride powder ranges from about 0.8 to 2.5 weight percent of the silicon nitride. Preferably, the oxygen content of the silicon nitride is between about 0.8 to 1.5 weight percent.

To obtain SiAlON materials having the most desirable properties, AlN is added to form the desired amount of alpha' SiAlON phase and to convert the oxides into the alpha' SiAlON phase, the beta' SiAlON phase and the additional intergranular phases. The aluminum nitride powder used in formulating these ceramics preferably has physical particle characteristics similar to that of the silicon nitride, and contains similar amounts of oxygen. In the case of aluminum nitride, the oxygen content is often expressed in equivalent aluminum oxide content.

Other amounts of silica and alumina and the like may be introduced as a result of the processing and again one skilled in the art will be able to compensate in the formulation. It is observed in this invention that the addition of aluminum in the form of aluminum oxide or compounds thereof such as magnesium aluminate spinel is detrimental to the development of desirable combinations of physical properties, and is thus most preferably avoided.

An exemplary method for forming the ceramic material is to first form a powder mixture containing (all amounts based on the SiAlON matrix):

i. silicon nitride powder as the major ingredient, as described above, having about 1 weight percent oxygen. As the major ingredient, the silicon nitride will generally comprise greater than 70 weight percent of the SiAlON matrix, more preferably greater than 80 weight percent, and most preferably about 90 weight percent;

ii. 0.1 to 20 parts by weight of an oxide or nitride of Y, Sc, La, or a RE, preferably yttria, more preferably 2 to 15 parts by weight, more preferably 3 to 10 parts by weight, most preferably 4 to 8 (or 5) parts by weight;

iii. 0.1 to 20 parts by weight of aluminum nitride, having about 1 percent oxygen, more preferably 2 to 15 parts by weight, more preferably 3 to 10 parts by weight, most preferably 4 to 8 (or 5) parts by weight;

iv. 0.1 to 6.5 parts by weight of an oxide or nitride of Mg, or of Ca, Sr or Ba, more preferably Mg in the amount of about 0.3 to 6.5, more preferably 0.5 to 5.0, and most preferably 0.6 to 4.0. Exemplary compounds from which the Mg may be derived include magnesium oxide, magnesium carbonate, magnesium carbonate hydrate, magnesium hydroxide, magnesium carbonate hydroxide pentahydrate, magnesium nitrate, magnesium sulfate and magnesium silicate. Most preferably the compounds are magnesium oxide, magnesium carbonate, magnesium carbonate hydrate, magnesium hydroxide, and magnesium carbonate hydroxide pentahydrate.

The powder materials are prepared into a slurry using a conventional apparatus such as a ball mill, attrition mill, or vibratory mill with a suitable milling media, preferably silicon nitride, high purity alumina or plastic coated material. An ultrasonic disperser may also be used. The powder is processed for a sufficient time to form a finely dispersed and well mixed suspension. The liquid of the suspension is removed after processing by drying or other means.

The liquid used to make the slurry may be any inorganic or organic compound which is liquid at room temperature such as water, hexane, alcohols, ketones or hydrocarbons or the like. The liquid is preferably water. The function of the liquid is to provide a suitable viscosity for handling the slurry and accomplishing the mixing. Any amount of liquid that accomplishes this is acceptable. Preferably, the solids content is between about 15 to 50 volume percent since below this limit mixing may be ineffective or separation by settling may occur. Above this amount the viscosity may be too high and mixing and de-agglomeration may not be effective.

When using water, a dispersant such as ammonium polymethacrylate may be used to aid in dispersion and suspension. Other compounds are known that provide similar functions in water and organic liquids, such as those listed above. The selection and quantity of the dispersant can vary widely as is well known in the art.

To limit the tendency of active materials such as aluminum nitride to hydrolyze or decompose in the presence of water, such compounds are generally not added to the mixture until the last approximately 15 minutes of the processing time. Alternatively passivated or coated particles of the material such as ART A100 WR grade aluminum nitride (available from Advanced Refractory Technologies, Buffalo, N.Y., USA) may be used.

After or during dispersion, organic compounds such as waxes, polyvinyl alcohol, and the like may be added to provide desirable green part processing characteristics as is well known in the art.

Once mixed the slurry is desirably dried using standard known methods, most preferably using spray drying to form a flowable powder particularly suitable for cold pressing into a green compact form or preform shape.

Once a suitable green compact is obtained, the item is densified so as to have closed porosity by heating or sintering. Any suitable densification technique may be used so long as the ceramic material of this invention is formed. Such methods include conventional sintering (i.e., without pressure, about 1500–1800° C.), microwave sintering, hot pressing, hot isostatic pressing or gas pressure sintering all of which are known to those familiar with the art. Densification may be optionally followed by heat treatment or hot isostatic pressing. The preferred methods are conventional sintering or microwave sintering. Microwave sintering, optionally followed by hot isostatic pressing, is the most preferred method. Any sintering processing temperature and subsequent heat treatment or hot isostatic pressing treatment is satisfactory provided the ceramic material described herein is obtained.

Preferably the material is heated in a microwave sintering furnace as described in U.S. Pat. No. 5,736,092 to Apté et al.

under an inert atmosphere of nitrogen (i.e., non-reactive gas, static or flowing) or the like to about 600° C. (300–900° C.) and held for sufficient time, about 1 hour, to remove the organic materials added as processing and pressing aids. This is followed by heating in the microwave furnace in a static or flowing non-reactive atmosphere, preferably of nitrogen, to between 1650 to 1800° C., more preferably to about 1700 to 1800° C., for sintering. At temperatures above about 1800° C., silicon nitride and in particular the SiAlON compounds of this invention will decompose into nitrogen gas and silicon metal without the application of a high over pressure of nitrogen gas.

It is technically difficult to accurately measure the high temperatures such as those used for these materials. Some variation in the preferred temperature may be observed depending on the method used to measure the temperature. The preferred temperatures of this invention are measured using a tungsten rhenium thermocouple suitably protected from the furnace atmosphere by protection tubes and isolated from electric fields by suitable electrical isolation and grounding. One skilled in the art of ceramic processing will understand that the time and temperature may be varied for any particular equipment to achieve the desired sintered density of the product.

Following sintering the material may not have achieved a fully dense form or the necessary intergranular phases may not have fully developed. Such materials may show low hardness or toughness. After sintering to a density sufficient to close the porosity, typically greater than about 90% of theoretical, more preferably greater than about 93.5% of the theoretical value, it is common to apply hot isostatic pressing in order to achieve density of greater than 98% or more, preferably greater than 99% of the theoretical value. Typically the temperature and pressure of hot isostatic pressing using a nitrogen, argon or the like non-reactive gas are between 1400 and 2000° C. and pressure of about 690 KPa (100 psi) to 413 MPa (60,000 psi). Preferably the temperature is between about 1475 and 1800° C. and the pressure between 6.9 MPa (1000 psi) and 206 MPa (30000 psi).

The ceramic material of the present invention is useful as a metal cutting tool for cutting metallic materials. Generally the ceramic material is in the form of a ceramic cutting tool insert for high speed chip forming of metallic materials, and has a rake face over which chips formed during the chip forming machining will flow, a flank face, and a cutting edge for cutting into the metallic materials at high speeds to form said chips, the cutting edge being formed at a junction of the rake face and the flank face. The cutting tool insert may have a partial or complete coating of a hard refractory material on at least part of its surface. Exemplary refractory materials are carbon, alumina, cubic boron nitride, titanium nitride, titanium carbo-nitride, and titanium aluminum nitride.

EXAMPLES

The following examples serve to illustrate the novel characteristics of the invention but are not intended to limit the scope of this invention. The results of each table are briefly discussed following each table.

The silicon nitride powder is commercially available from Ube Industries (America), New York, N.Y., USA, under the trade designation E-10. It contains about 1.2 weight percent oxygen, less than 50 ppm Cl, less than 10 ppm Fe, less than 10 ppm Ca, less than 10 ppm Al, and is more than 95 percent alpha phase. Aluminum nitride powder is commercially available under the trade designation Grade F from Tokuyama America Inc., San Mateo, Calif., USA, and has less than 1.0 weight percent oxygen, less than 50 ppm Ca, less than 20 ppm Si and less than 15 ppm Fe. Suitable AlN is also available from Advanced Refractory Technologies of Buffalo, N.Y., USA, under the trade designation A100 WR. It contains about 1.4 weight percent oxygen, less than 100 ppm Fe, about 0.2 weight percent carbon and an average particle size of about 2.6 microns.

H. C. Stark Inc., Newton Mass., USA, supplies yttrium oxide and Anachemia Sciences supplies magnesium containing compounds such as magnesium hydroxide, magnesium oxide, magnesium aluminate and magnesium carbonate hydroxide pentahydrate. For the purposes of the following examples the magnesium carbonate hydroxide pentahydrate is referred to as magnesium carbonate or $MgCO_3$.

Example 1

A series of powder mixtures was prepared using the components and weight percent amounts identified in Table 1. The total column refers to all compositions in parts by weight. The mixtures were formed into green pre-forms by milling each separately in a polyurethane mill jar having a 6.3 liter volume, which was loaded with about 4400 g of nylon coated media. The liquid vehicle was de-ionized water (1000–1500 grams). A dispersion aid in the form of ammonium polymethacrylate was added to the mill. Milling was carried on for a time of 16 hours. The aluminum nitride powder was added to the slurry after it was removed from the milling jar.

After milling the slurry was separated from the media, and organic binders in the form of a water based stearic acid emulsion and an acrylic polymer water-based dispersion (250–400 g total) were added and stirred in. The resulting slurry was spray dried using a Niro spray dryer model Production Minor in order to make a free flowing powder suitable for dry pressing.

The samples were formed into cutting tool shapes as described in ANSI B212.4-1995 (American National Standards Institute) using a conventional dry pressing process.

TABLE 1

Compositions of samples in parts by weight

| Comp. | $Si_3N_4$ | $Y_2O_3$ | $Al_2O_3$ | AlN | MgO | $MgAl_2O_4$ | $MgCO_3$ | $Mg(OH)_2$ | Total |
|---|---|---|---|---|---|---|---|---|---|
| Control A* | 90 | 5 | | 5 | | | | | 100.00 |
| 83 | 87.75 | 5.00 | 2.30 | 5.00 | 0.25 | | | | 100.30 |
| 84 | 87.75 | 5.00 | 3.50 | 3.50 | 0.25 | | | | 100.00 |

TABLE 1-continued

Compositions of samples in parts by weight

| Comp. | $Si_3N_4$ | $Y_2O_3$ | $Al_2O_3$ | AlN | MgO | $MgAl_2O_4$ | $MgCO_3$ | $Mg(OH)_2$ | Total |
|---|---|---|---|---|---|---|---|---|---|
| 96 | 87.75 | 5.00 | 1.67 | 5.00 | | 0.88 | | | 100.30 |
| Control B* | 91 | 4.5 | | 4.5 | | | | | 100.00 |
| Control C* | 91 | 4.5 | 0.30 | 4.5 | | | | | 100.30 |
| 119 | 85.50 | 5.00 | 0.93 | 5.00 | | 3.57 | | | 100.00 |
| 89 | 90.00 | 5.00 | 0.30 | 5.00 | 0.10 | | | | 100.40 |
| 90 | 90.00 | 5.00 | 0.30 | 5.00 | 0.25 | | | | 100.55 |
| 102 | 90.00 | 5.00 | | 5.00 | | 0.03 | | | 100.03 |
| 116 | 89.82 | 5.00 | | 5.00 | | 0.18 | | | 100.00 |
| 117 | 89.24 | 4.50 | | 4.50 | | 1.76 | | | 100.00 |
| 119 | 85.50 | 5.00 | 0.93 | 5.00 | | 3.57 | | | 100.00 |
| 126 | 90.50 | 4.50 | | 4.50 | | | 2.16 | | 101.66 |
| 127 | 90.50 | 4.50 | | 4.50 | | | | 0.72 | 100.22 |
| 131 | 90.50 | 4.50 | | 4.50 | | | 1.08 | | 100.58 |
| 132 | 90.50 | 4.50 | | 4.50 | | | 4.32 | | 103.82 |
| 135 | 90.50 | 4.50 | | 4.50 | | | 8.64 | | 108.14 |
| 136 | 90.50 | 4.50 | | 4.50 | | | 17.28 | | 116.78 |
| 137 | 90.50 | 4.50 | | 4.50 | | | | 2.88 | 102.38 |

*Not an example of this invention

The samples were placed on graphite plates and sintered at about 1755° C. for about 25 minutes in a microwave sintering furnace described by U.S. Pat. Nos. 5,736,092 and 5,808,282 to Apté et al. Following sintering, the parts were hot isostatically pressed at 1800° C. for 30 minutes using a pressure of 69 MPa (10,000 psi) argon. The sintering conditions and results are in Table 2, with elemental Mg content identified for reference purposes only.

TABLE 2

Sintering tests and results

| Blend | Log No | Mg | Sinter No. | Sinter Conditions | Density | Hardness Ra | Toughness $K_{1c}$ |
|---|---|---|---|---|---|---|---|
| Control A | | 0 | 2576D | 1760° C./20 min | | 95.0 | 6.2 |
| 83 | 22-30-1 | 0.15 | 2576D | 1760° C./20 min | | 94.4 | 6.8 |
| 89 | 22-30-6 | 0.06 | 2576D | 1760° C./20 min | 3.257 | 95.0 | 5.8 |
| 90 | 22-30-7 | 0.15 | 2576D | 1760° C./20 min | 3.253 | 94.9 | 6.0 |
| Control B | 22-180 | 0 | | 1750° C./30 min | 3.240 | 95.1 | 6.4 |
| Control C | 22-181 | 0 | | 1750° C./30 min | 3.232 | 95.0 | 6.2 |
| Control A | | 0 | 2911B | 1755° C./30 min | 3.253 | 94.8 | 6.5 |
| 81 | 22-131 | 0.15 | 2911B | 1755° C./30 min | 3.252 | 94.8 | 6.4 |
| 83 | 22-128 | 0.15 | 2911B | 1755° C./30 min | 3.246 | 94.8 | 6.8 |
| 84 | 22-129 | 0.15 | 2911B | 1755° C./30 min | 3.244 | 94.6 | 6.9 |
| 96 | 22-132 | 0.15 | 2911B | 1755° C./30 min | 3.251 | 94.6 | 6.5 |
| Control A | | 0 | 3075B | 1755° C./30 min | | 94.7 | 6.5 |
| 116 | 28-11 | 0.03 | 3075B | 1755° C./30 min | 3.256 | 95.0 | 6.4 |
| 117 | 28-12 | 0.54 | 3075B | 1755° C./30 min | 3.239 | 94.7 | 6.9 |
| Control A | | 0 | 3148D | 1755° C./30 min | 3.256 | 94.9 | 6.3 |
| 126 | 28-40 | 0.54 | 3148D | 1755° C./30 min | 3.252 | 94.7 | 7.3 |
| 135 | 21-108 | 2.1 | 3149D | 1755° C./30 min | 3.236 | 94.4 | 8.7 |
| 132 | 21-07 | 1.07 | 3151D | 1755° C./30 min | 3.247 | 94.3 | 7.1 |
| 135 | 21-108 | 2.1 | 3151D | 1755° C./30 min | 3.234 | 94.0 | 8.2 |
| 132 | 21-111 | 1.07 | 3153A | 1755° C./30 min | 3.242 | 94.4 | 7.8 |
| 132 | 21-111 | 1.07 | 3154A | 1755° C./30 min | 3.236 | 94.7 | 7.0 |
| 126 | 28-40 | 0.54 | 3144A | 1755° C./30 min | 3.248 | 94.5 | 7.1 |
| Control A | | 0 | 3144A | 1755° C./30 min | 3.253 | 95.0 | 6.5 |
| 132 | 28-44 | 1.07 | 3144A | 1755° C./30 min | 3.246 | 94.5 | 7.9 |
| 132 | 21-113 | 1.07 | 3155A | 1755° C./30 min | 3.244 | 94.5 | 7.4 |
| 136 | 21-114 | 4.05 | 3156A | 1755° C./30 min | Bloated | | |
| 137 | 21-115 | 2.1 | 3156A | 1755° C./30 min | 3.246 | 94.1 | 7.2 |
| Control A | | 0 | 3156A | 1755° C./30 min | | 94.8 | 6.5 |

Composition 136, when sintered under the conditions specified, exhibited development of extensive internal porosity or "bloating" and was thereby unsuitable for further processing testing or property testing.

In all cases the compositions with significant additions of a magnesium containing compound exhibited a significant increase in fracture toughness without a large negative effect on the Rockwell A hardness. This yielded products with excellent combinations of hardness and toughness. A larger Mg level was associated with better properties. Above a level of Mg of about 3 weight percent, the compositions became difficult to sinter successfully due to bloating when magnesium carbonate was used to provide the Mg and this processing method was used.

Those compositions that contained large amounts of alumina in addition to the Mg additions did not exhibit the best combinations of hardness and toughness. Although the mechanisms for this are not well understood, it is likely due to a change in the ratio of alpha' to beta' SiAlON phases or in the detailed distribution and composition of the other intergranular phases.

In further sintering tests, samples were placed on graphite plates and sintered at about 1775° C. for about 60 minutes in a microwave sintering furnace described by U.S. Pat. Nos. 5,736,092 and 5,808,282 to Apté et al. Following sintering, the parts were hot isostatically pressed at 1800° C. for 30 minutes using a pressure of 69 MPa (10,000 psi) argon. The sintering conditions and results are presented in Table 3. HIP Density refers to density after hot isostatic pressing (g/cc). HIP Ra refers to Rockwell A hardness of the finished ceramic after HIP. HIP $K_{ic}$ refers to indentation Fracture Toughness of the finished ceramic after HIP.

TABLE 3

Sintering tests at about 1775° C. and results.

| Blend | Log No. | Mg | Sinter No. | Sinter Conditions | HIP Density | HIP Ra | HIP $K_{1c}$ |
|---|---|---|---|---|---|---|---|
| 119 | 28-14 | 0.61 | 3088B | 1775° C./1 hour | 3.250 | 94.4 | 6.2 |
| 126 | 28-24 | 0.54 | 3124A | 1775° C./1 hour | 3.250 | 94.5 | 7.2 |
| Control A | | 0 | 3124A | 1775° C./1 hour | 3.252 | 94.9 | 6.3 |
| 126 | 28-40 | 0.54 | 3124A | 1775° C./1 hour | 3.250 | 94.6 | 7.1 |
| 126 | 28-41 | 0.54 | 3124A | 1775° C./1 hour | 3.251 | 94.6 | 7.0 |
| 127 | 28-25 | 0.42 | 3124A | 1775° C./1 hour | 3.251 | 94.8 | 6.2 |
| 130 | 28-42 | 0.54 | 3124A | 1775° C./1 hour | 3.245 | 94.5 | 7.6 |
| 131 | 28-43 | 0.27 | 3128D | 1775° C./1 hour | 3.252 | 94.4 | 6.9 |
| 132 | 28-44 | 1.07 | 3128D | 1775° C./1 hour | 3.248 | 94.1 | 8.4 |
| Control A | | 0 | 3128A | 1775° C./1 hour | 3.263 | 94.6 | 6.3 |

Under these sintering conditions the presence of significant levels of Mg resulted in surprisingly improved combinations of hardness and toughness. Again, it is seen that the use of an alumina containing raw material such as used in composition 119 did not produce significantly enhanced combination of properties compared to the control A that did not contain any magnesium.

XRD tests done on blend 126 showed the existence of a third crystalline phase that was not alpha' or beta' SiAlON. This phase is the intergranular phase between the alpha' and beta' phases.

Example 2

A series of additional powder mixtures was prepared using the components and weight percent amounts identified in Table 4. One mixture (No. 126) was formed into green pre-forms by milling each separately in an alumina mill jar having a 6.3 liter volume, which was loaded with about 5200 g of alumina media. Other mixtures were formed using as an alternative a small addition of alumina (Ceralox™ HPA 0.5 grade) added to the batch, and milling in a polyurethane mill jar having a 6.3 liter volume which was loaded with about 4400 g of nylon coated media. The alumina addition approximates the wear observed from a ceramic mill. The liquid vehicle was de-ionized water (about 1200 g). A dispersion aid in the form of ammonium polymethacrylate was added to the mill. Milling was carried on for a time of 16 hours. The aluminum nitride powder was added to the slurry after it was removed from the milling jar.

After milling the slurry was separated from the media, and organic binders in the form of a water based stearic acid emulsion and an acrylic polymer water-based dispersion (about 350 g total) were added and stirred in. The resulting slurry was spray dried using a Niro spray dryer model Production Minor in order to make a free flowing powder suitable for dry pressing.

TABLE 4

Additional precursor mixes

| Comp. | $Si_3N_4$ | $Y_2O_3$ | $Al_2O_3$ | AlN | $MgCO_3$ | Total |
|---|---|---|---|---|---|---|
| 126 | 90.50 | 4.50 | | 4.50 | 2.16 | 101.66 |
| 130 | 90.50 | 4.50 | 0.30 | 4.50 | 2.16 | 101.96 |

In further sintering tests, samples were placed on graphite plates and sintered at about 1755° C. for about 30 minutes and at about 1775° C. for 60 minutes in a microwave sintering furnace described by U.S. Pat. Nos. 5,736,092 and 5,808,282 to Apté et al. Following sintering, the parts were hot isostatically pressed at 1800° C. for 30 minutes using a pressure of 69 MPa (10,000 psi) argon. The sintering conditions and results are presented in Table 5.

TABLE 5

Results of sintering tests on batches containing traces of alumina

| Blend | Log No. | Mg | Sinter No. | Sinter Conditions | HIP Density | HIP Ra | HIP K$_{Is}$ |
|---|---|---|---|---|---|---|---|
| 83 | 22-128 | 0.05 | 2911B | 1755° C./30 min | 3.246 | 94.8 | 6.8 |
| 84 | 22-129 | 0.15 | 2911B | 1755° C./30 min | 3.244 | 94.6 | 6.9 |
| 126 | 28-51 | 0.54 | 3132A | 1755° C./30 min | 3.247 | 94.5 | 7.3 |
| Control A | | 0 | 3132A | 1755° C./30 min | 3.252 | 94.9 | 6.3 |
| 130 | 28-50 | 0.54 | 3132A | 1755° C./30 min | 3.247 | 94.6 | 7.3 |
| 126 | 28-40 | 0.54 | 3144A | 1755° C./30 min | 3.248 | 94.5 | 7.1 |
| Control A | | 0 | 3144A | 1755° C./30 min | 3.253 | 95.0 | 6.5 |
| 126 | 28-51 | 0.54 | 3144A | 1755° C./30 min | 3.243 | 94.4 | 7.4 |
| 130 | 28-42 | 0.54 | 3144A | 1755° C./30 min | 3.247 | 94.6 | 7.1 |
| 130 | 28-50 | 0.54 | 3144A | 1755° C./30 min | 3.247 | 94.7 | 7.4 |
| Control A | | 0 | 3148D | 1755° C./30 min | 3.256 | 94.9 | 6.3 |
| 126 | 28-51 | 0.54 | 3148D | 1755° C./30 min | 3.246 | 94.5 | 7.1 |
| 130 | 28-42 | 0.54 | 3148D | 1755° C./30 min | 3.248 | 94.7 | 7.3 |
| Control A | | 0 | 3124A | 1775° C./1 hour | 3.252 | 94.9 | 6.3 |
| 130 | 28-42 | 0.54 | 3124A | 1775° C./1 hour | 3.245 | 94.5 | 7.6 |

In this series of tests it was seen that the presence of small amounts of alumina such as the amounts typically added by milling with inexpensive alumina mills and media did not prevent the surprisingly good combination of properties being realized. Large amounts of alumina, such as are present in composition 83 and 84, prevented the realization of excellent combined properties.

Example 3

A series of powder mixtures containing a substantially inert filler as a dispersed phase were prepared using the components and weight percent amounts identified in Table 6. The mixtures were formed into green pre-forms by milling each separately in a nylon mill jar having a 6.3 liter volume, which was loaded with about 4400 g of nylon coated media. The liquid vehicle was de-ionized water (1000–1500 g). A dispersion aid in the form of ammonium polymethacrylate was added to the mill. Milling was carried on for a time of 16 hours. The aluminum nitride powder was added to the slurry after it was removed from the milling jar.

After milling, the slurry was separated from the media, and organic binders, in the form of a water-based stearic acid emulsion, and an acrylic polymer water-based dispersion (about 350 g total) were added and stirred in. The resulting slurry was spray dried using a Niro spray dryer model Production Minor in order to make a free flowing powder suitable for dry pressing.

TABLE 6

Compositions of precursor batches containing inert fillers in parts by weight

| Comp. | Si$_3$N$_4$ | Y$_2$O$_3$ | Al$_2$O$_3$ | AlN | MgO | MgCO$_3$ | TiN | Total |
|---|---|---|---|---|---|---|---|---|
| Control D* | 81.82 | 4.55 | 0.30 | 4.55 | | | 9.09 | 100.31 |
| 92 | 81.82 | 4.55 | 0.30 | 4.55 | 0.10 | | 9.09 | 100.41 |
| 93 | 81.82 | 4.55 | 0.30 | 4.55 | 0.25 | | 9.09 | 100.56 |
| 133 | 81.50 | 4.00 | | 4.00 | | 1.95 | 10.00 | 101.45 |
| 134 | 90.50 | 4.50 | | 4.50 | | 4.32 | 10.00 | 113.82 |

*Not an example of this invention

In further sintering tests, samples were placed on graphite plates and sintered at about 1775° C. for about 60 minutes in a microwave sintering furnace described by U.S. Pat. Nos. 5,736,092 and 5,808,282 to Apté et al. Following sintering, the parts were hot isostatically pressed at 1800° C. for 30 minutes using a pressure of 69 MPa (10,000 psi) argon. The sintering conditions and results were as follows in Table 7.

TABLE 7

| Blend | Log No | Mg | Sinter No. | Sinter Conditions | HIP Density | HIP Ra | HIP K$_{1c}$ |
|---|---|---|---|---|---|---|---|
| 133 | 28-45 | 0.49 | 3128D | 1775° C./1 hour | 3.367 | 93.9 | 7.2 |
| 133 | 28-45 | 0.49 | 3144A | 1755° C./30 min | 3.367 | 94.4 | 7.4 |
| 133 | 28-45 | 0.49 | 3148D | 1755° C./30 min | 3.367 | 94.3 | 7.1 |
| 133 | 28-45 | 0.49 | 3149D | 1755° C./30 min | | 94.2 | 7.2 |
| 134 | 21-109 | 0.97 | 3149D | 1755° C./30 min | 3.357 | 94.3 | 7.5 |
| 134 | 21-109 | 0.97 | 3151D | 1755° C./30 min | 3.356 | 94.0 | 7.7 |
| Control D* | | 0 | 2576D | 1745° C./15 min | | 94.7 | 6.6 |
| 92 | | 0.05 | 2576D | 1745° C./15 min | | 94.7 | 6.6 |
| 93 | | 0.13 | 2576D | 1745° C./15 min | | 94.7 | 6.7 |

*Not an example of this invention

It was noted that the addition of the magnesium in quantities of greater than 0.13 weight percent resulted in a surprisingly good combination of properties, in that high hardness of greater than or equal to 94.0 Rockwell A was retained, in combination with toughness values of greater than 7.0. Similar results would be expected with a higher amount of an inert filler or with a different filler such as a carbide, carbo-nitride, oxy-carbide or similar material as set forth above.

Example 4

The sample compositions prepared as described in Example 1 were formed into cutting tool shapes of an ANSI CNGX 45 insert as described in ANSI B212.4–1995 and sintered as described in the previous examples. The finished inserts were used to machine gray cast iron castings under the following conditions:

TABLE 8

| | |
|---|---|
| Process 1 | Feed 0.55 mm per rev. @ speed 850 m per min. |
| Process 2 | Feed 0.60 mm per rev. @ speed 850 m per min. |
| Process 3 | Feed 0.65 mm per rev. @ speed 850 m per min. |
| Number of pieces run per insert | 100 |

The wear on the insert and comparable commercial silicon nitride inserts grade SL500 from CeramTec AG Ebersback, Germany and SiAlON inserts grade MW43 from Indexable Cutting Tools Ltd., Welland, Ontario, Canada, was measured. The wear at the tangency of the nose radius was measured using an optical comparator with a 0.0001 inch resolution X-Y readout. The wear on the flank was measured using a 20× optical microscope equipped with a scaled eyepiece with 0.002 inch accuracy. The average results for the first test (leg A) were as follows:

TABLE 9

| Insert Material | # inserts tested | Nose wear (in) | Flank Wear (in) |
|---|---|---|---|
| SL500 | 4 (no chipped inserts) | 0.0151 | 0.039 |
| MW43 | 1 (second insert chipped) | 0.0098 | 0.020 |
| Composition 117 | 2 (no chipped inserts) | 0.0118 | 0.026 |

The increased toughness of the 117 composition of this invention should reduce chipping failure such as was observed with the MW43 SiAlON grade. The average results for the second test (leg B) run under the same conditions were as follows:

TABLE 10

| Insert Material | # inserts tested | Nose wear (in) | Flank Wear (in) |
|---|---|---|---|
| SL500 | 3 | 0.0159 | 0.040 (avg. 2 values) |
| Composition 126 | 1 | 0.0127 | 0.032 |

The composition 126 of this invention showed significantly less wear than the SL500 silicon nitride grade.

Example 5

In a third machining performance test, the inserts of Example 4 were used to machine gray cast iron castings under the following conditions:

TABLE 11

| | |
|---|---|
| Process 1 | Feed 0.60 mm per rev. @ speed 720 m per min. |
| Process 2 | Feed 0.40 mm per rev. @ speed 720 m per min. |
| Process 3 | Feed 0.40 mm per rev. @ speed 720 m per min. |
| Process 4 | Feed 0.45 mm per rev. @ speed 720 m per min. |
| Number of pieces run per insert | 100 |

The wear on the insert and comparable commercial silicon nitride inserts grade SL500 and SiAlON inserts grade MW43 from Indexable Cutting Tools was measured. The wear at the tangency of the nose radius was measured using an optical comparator with a 0.0001 inch resolution X-Y readout. The average results for the third test were as follows:

TABLE 12

| Insert Material | # inserts tested | Nose wear (in) |
|---|---|---|
| Sl500 | 5 | 0.0154 |
| MW43 | 2 | 0.0104 |
| Composition 126 | 2 | 0.0076 |
| Composition 117 | 2 | 0.0098 |

Both Mg containing grades of this invention showed reduced wear compared to conventional silicon nitride and SiAlON grade inserts.

Example 6

The existence of both Mg and Y in the alpha' SiAlON ceramic materials of the present invention was shown by the use of energy dispersive x-ray analysis in conjunction with bright field electron microscopy. Thin samples were prepared by mechanically grinding samples to approximately 60 $\mu$m thickness followed by conventional Ion thinning. The samples were coated with carbon to prevent charging. Analysis was done using a JOEL™ 2010 transmission electron microscope. Energy dispersive x-ray analysis was done with a spatial resolution of typically 100 nm. Electron diffraction patterns showed that the sample areas were single grains. Analysis clearly showed the presence of both Mg and Y simultaneously in the alpha' SiAlON phase and the absence of both in the beta phase. Representative peak intensity data is summarized below. Sample C2–6 corresponds to Blend 132 in the above examples, but was microwave sintered at 1725° C. for 30 minutes followed by hot isostatic pressing (HIP) at 1500° C. in 69 MPa of Ar. Sample 4 corresponds to Blend 135 in the above examples and was microwave sintered at 1755° C. for 60 minutes followed by HIP at 1800° C. in 69 MPa of Ar.

TABLE 13

Normalized spectra peak intensities Beta SiAlON

| | | | Beta SiAlON Phase Xray Intensities $I/I_{Si}$ | | | |
|---|---|---|---|---|---|---|
| Sample ID | MgO Wt % | Spectra ID | Si | Al | Y | Mg |
| C2-6 | 1.77 | 2-6-2 | 1.0 | 0.22 | N.D. | N.D. |
| 4 | 3.48 | 4-6 | 1.0 | 0.24 | N.D. | N.D. |

(N.D. Not Detected)

TABLE 14

Normalized spectra peak intensities Alpha SiAlON

| | | | Alpha SiAlON Phase Xray Intensities $I/I_{Si}$ | | | |
|---|---|---|---|---|---|---|
| Sample ID | MgO Wt % | Spectra ID | Si | Al | Y | Mg |
| C2-6 | 1.77 | 2-6-2 | 1.0 | 0.20 | 0.10 | 0.11 |
| 4 | 3.48 | 4-6 | 1.0 | 0.33 | 0.08 | 0.15 |

Component c) was found to include each of Si, Al, O, N, Y and Mg by the same testing.

Example 7

The following additional ceramic materials were prepared in accordance with the present invention. Unless otherwise noted, the materials were prepared in accordance with the details of Example 2.

TABLE 15

| | Parts Matrix By Weight | | | | | Parts Filler By Weight | | |
|---|---|---|---|---|---|---|---|---|
| Blend Description | $Si_3N_4$ | $Y_2O_3$ | AlN | MgO | $Al_2O_3$ | TiN A | TiN C | Ti(C, N) A |
| 192 More MgO, fewer total moles + TiN | 89.35 | 2.67 | 4.44 | 3.54 | | | 25.00 | |
| 196 3.5% MgO + Grade A TiN | 87.79 | 4.37 | 4.37 | 3.48 | | 25.00 | | |
| 198 B1 47 with Ti(C, N) Grade A | 87.30 | 8.75 | | | 3.95 | | | 25.00 |
| 200 B1 196 with TiN Grade C | 87.79 | 4.37 | 4.37 | 3.48 | | | 25.00 | |
| 201 B1 196 with Ti(C, N) 50/50 Grade A | 87.79 | 4.37 | 4.37 | 3.48 | | | | 25.00 |
| 135 3.5% MgO | 87.79 | 4.37 | 4.37 | 3.48 | | | | |

The powders were formed into shapes as before and sintered in a microwave furnace followed by heat treatment in a hot isostatic press under 69 MPa of Ar gas using combinations of temperatures and hold times identified in the following table. Dense ceramic samples were obtained.

TABLE 16

| | Process Conditions | | | |
|---|---|---|---|---|
| | Microwave Sinter | | HIP | |
| Condition | Temperature (° C.) | Hold Time (min) | Temperature (° C.) | Hold Time (min) |
| A | 1710 | 60 | 1500 | 30 |
| B | 1790 | 60 | 1500 | 30 |
| C | 1710 | 60 | 1800 | 30 |
| D | 1790 | 60 | 1800 | 30 |

Properties were determined as previously described. Results were as follows:

TABLE 17

| Blend | Processing | Rockwell A | $K_{1c}$ | Wear Parameter ($Ra^{1/2} \times K_{1c}^{3/4}$) |
|---|---|---|---|---|
| 198* | B | 92.8 | 5.9 | 36.5 |
| 192 | B | 93.2 | 8.4 | 47.6 |
| 192 | D | 93 | 7.9 | 45.4 |
| 196 | B | 92.9 | 8.8 | 49.2 |
| 196 | D | 92.7 | 8.3 | 47.1 |
| 200 | B | 93.2 | 8.1 | 46.4 |
| 200 | D | 92.5 | 7.6 | 44.0 |
| 201 | B | 94.6 | 7.9 | 45.8 |
| 135 | B | 94.4 | 8.5 | 48.4 |
| 135 | C | 94.3 | 8.8 | 49.6 |
| 135 | D | 93.7 | 8.8 | 49.5 |

*Blend 198 is not an example of this invention, it provides a prior art comparison.

The substantially better wear parameter indicated better machine performance for compositions of the present invention.

Other embodiments of the invention will be apparent to those skilled in the art. It is to be considered that the specifications and examples within this patent are considered as exemplary only.

All references mentioned in this specification are indicative of the level of skill of those skilled in the art and are herein incorporated by reference to the same extent as if each individual reference was specifically indicated to be incorporated by reference.

We claim:

1. A method of preparing SiAlON ceramic material comprising:
   a) providing a powder mixture of:
      i. silicon nitride as the major ingredient;
      ii. 0.1 to 20 parts by weight of an oxide or nitride of Sc, Y, La or a RE;
      iii. 3 to 20 parts by weight of aluminum nitride;
      iv. 0.1 to 6.5 parts by weight of an oxide or nitride of Mg and optionally one or of more of Ca, Sr, and Ba; and
      v. less than 1.5 weight percent aluminum oxide or compounds containing aluminum oxide;
   b) forming a green compact from the powder mixture; and
   c) heating the green compact to form a ceramic material with closed porosity, said heating step comprising:
   c1) an optional first heating step at between 300 and 900° C. in a static or flowing non-reactive atmosphere;
   c2) a second heating step at between 1650 and 1800° C. in a static or flowing non-reactive atmosphere; and
   c3) an optional third heating step in a hot isostatic press at between 1400 and 2000° C. under a pressure of a non-reactive gas at a pressure of between 690 KPa and 413 MPa; and
   d) forming a SiAlON ceramic material into a metal cutting tool insert or a ceramic tool for high speed chip forming of metallic materials.

2. The method of claim 1, wherein step c2 comprises: heating at between 1700 and 1800° C. in a static or flowing non-reactive atmosphere.

3. A method of preparing a SiAlON ceramic material comprising:
   a) providing a powder mixture of:
      i. silicon nitride as the major ingredient;
      ii. 0.1 to 20 parts by weight of an oxide or nitride of Sc, Y, La or a RE;
      iii. 0.1 to 20 parts by weight of aluminum nitride;
      iv. 0.1 to 6.5 parts by weight of an oxide or nitride of Mg and optionally one or more of Ca, Sr, and Ba;
   b) forming a green compact from the powder mixture; and
   c) heating the green compact to form a ceramic material with closed porosity, said heating step comprising:
   c1) an optional first heating step at between 300 and 900° C. in a static or flowing non-reactive atmosphere;
   c2) a second heating step at between 1650 and 1800° C. in a static or flowing non-reactive atmosphere conducted in a microwave sintering furnace; and
   c3) an optional third heating step in a hot isostatic press at between 1400 and 2000° C. under a pressure of a non-reactive gas at a pressure of between 690 KPa and 413 MPa.

4. The method of claim 3, wherein the heating step c2 is conducted at between 1700 and 1800° C. in a flowing non-reactive gas.

5. The method of claim 3, wherein components ii and iii are each provided in an amount of 2 to 15 parts by weight.

6. The method of claim 3, wherein components ii and iii are each provided in an amount of 3 to 10 parts by weight.

7. The method of claim 6, wherein component iv is provided in an amount of 0.3 to 6.5 weight percent.

8. The method of claim 6, wherein component iv is provided in an amount of 0.5 to 5.0 weight percent.

9. The method of claim 6, wherein component iv is provided in an amount of 0.6 to 4.0 weight percent.

10. The method of claim 9, wherein component ii is an oxide or nitride of one or core of Sc, Y, La, Yb, Sm, Nd, Pr.

11. The method of claim 9, wherein component ii is an oxide or a nitride of one or both of Y and Yb.

12. The method of claim 9, wherein component ii is an oxide or nitride of Y.

13. The method of claim 12, which produces a ceramic material having a hardness greater than 93.5 Rockwell A, and a fracture toughness greater than 6.5 MPam$^{1/2}$.

14. The method of claim 13, which produces a ceramic material having a fracture toughness greater than 7.0 MPam$^{1/2}$.

15. The method of claim 9 or 12, wherein component iv is an oxide or nitride of Mg.

16. The method of claim 12, wherein the powder mixture has less than 1.0 weight percent alumina oxide or compounds containing aluminum oxide.

17. The method of claim 12, wherein the powder mixture further comprises one or more substantially inert filler selected from a known oxide, nitride, suicide, carbide, carbo-oxy-nitride, oxy-carbide, carbo-nitride, or boride of one or more of the elements Ti, Zr, Hf, Nb, Ta, V, Cr, Mo, W, B, and Si, included in an amount between 1.5 and 40 volume percent, based on the ceramic material.

18. The method of claim 17, wherein the filler is selected from one or more of TiN, Ti(C,N), Mo$_2$C, TiC, and SiC, included in an amount between 2 and 25 volume percent.

19. The method of claim 18, wherein the filler is selected from one or more of TiN, Ti(C,N), Mo$_2$C.

20. The method of claim 19, which produces a ceramic material having a hardness greater than 92 Rockwell A, a fracture toughness greater than 6.5 MPam$^{1/2}$.

21. The method of claim 20, which produces a ceramic material having a fracture toughness greater than 7.0 MPam$^{1/2}$.

22. The method of claim 13, 16, or 20, which further comprises forming the ceramic material into a metal cutting tool insert.

23. The method of claim 1, 13, 16, or 20, which further comprises forming the ceramic material into a metal cutting tool insert, and then forming on at least part of its surface a partial or complete coating of a hard refractory material selected from carbon, alumina, cubic boron nitride, titanium nitride, titanium carbo-nitride, and titanium aluminum nitride.

24. The method of claim 9, wherein the powder mixture has less than 1.5 weight percent alumina oxide or compounds containing aluminum oxide.

25. The method of claim 1 or 9, wherein the powder mixture further comprises one or more substantially inert filler selected from a known oxide, nitride, silicide, carbide, carbo-oxy-nitride, oxy-carbide, carbo-nitride, or boride of one or more of the elements Ti, Zr, Hf, Nb, Ta, V, Cr, Mo, W, B, and Si, included in an amount between 1.5 and 40 volume percent, based on the ceramic material.

26. The method of claim 1 or 3, wherein components ii and iii are each provided in an amount of 4 to 8 parts by weight.

* * * * *